Figure 1:
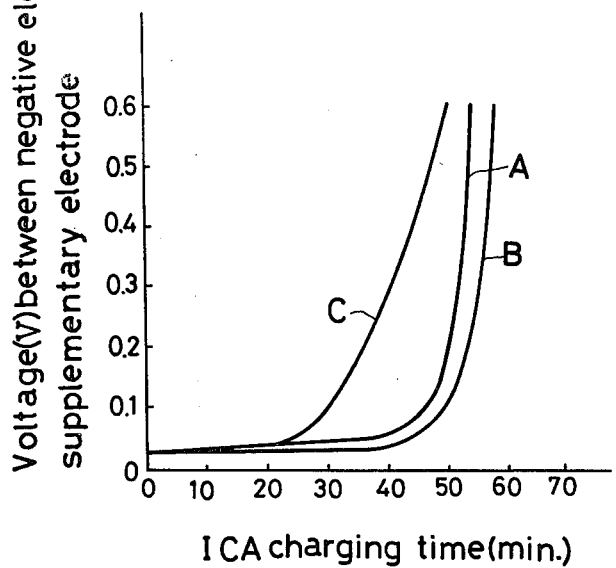

United States Patent [19]

Suzuki

[11] 4,434,214
[45] Feb. 28, 1984

[54] ALKALINE STORAGE BATTERY

[75] Inventor: Shogo Suzuki, Yamato, Japan

[73] Assignee: Furukawa Denchi Kabushiki Kaisha, Japan

[21] Appl. No.: 439,425

[22] Filed: Nov. 5, 1982

[30] Foreign Application Priority Data

Nov. 16, 1981 [JP] Japan ................. 56-182234

[51] Int. Cl.³ .................................. H01M 10/34
[52] U.S. Cl. ........................... 429/59; 429/94
[58] Field of Search ............. 429/59, 58, 57, 90, 429/94, 206

[56] References Cited

U.S. PATENT DOCUMENTS 3,096,215 7/1963 Voss et al. .................. 429/59
4,143,212 3/1979 Veno et al. ................ 429/59 X Primary Examiner—Anthony Skapars
Attorney, Agent, or Firm—Abelman, Frayne & Rezac

[57] ABSTRACT

An alkaline storage battery having located in a battery container a battery element comprising a positive electrode, a negative electrode, a separator and a gas ionizing auxiliary electrode, in which the gas ionizing electrode is contained in a bag of microporous film, is described.

6 Claims, 4 Drawing Figures

ALKALINE STORAGE BATTERY

The present invention provides an alkaline storage battery of a type having contained, in a battery container, a battery element comprising a positive electrode, a negative electrode, a separator and a gas ionizing auxiliary electrode, wherein the gas ionizing electrode is a hollow tube electrode which is put in a center hollow space of a wound battery element and the gas ionizing electrode and the wound battery element are separated by a bag or sleeve of microporous film interposed therebetween.

The bag or sleeve of microporous film can be open at its top end or can be sealed at its top end.

The microporous film can be made of a microporous resin or plastic film, preferably polypropylene film.

The bag or sleeve of microporous film can be up to $0.2 \times 0.02\mu$ in its largest pore size, with 38% in porosity and be $25\mu$ in thickness.

This invention relates to an alkaline storage battery having a gas ionizing auxiliary electrode contained therein, characterized in that the gas ionizing electrode is contained in a bag or sleeve of microporous film. It has previously been usual with an alkaline storage battery containing a gas ionizing auxiliary electrode without a microporous film that an electric charging, such as rapid charging, is carried out in such a manner that the oxygen gas generated from the positive electrode at the final stage of the charging is ionized by the auxiliary electrode and any change is an electric voltage or an electric current as produced at that time is measured by a detector against the negative electrode, while the positive electrode or any other reference electrode is used as an opposite polarity electrode of the auxiliary electrode. Thus, for instance, when an electric voltage between the two electrodes reaches a predetermined value, the electric charging circuit is cut off or is changed over to that of trickle charging automatically, so that the predetermined amount of charging of the battery is completed.

It is usual in this case that the change in the detected electric voltage between the auxiliary electrode and the negative electrode in relation to the 1C charging time (minute) becomes a gradually rising curve as shown by a curved line C in FIG. 1. In general, detectors are produced which have a dispersion in detection operation, and therefore it has happened that some of these detectors operate below 0.6 V when it is required that all of them should operate accurately at 0.6 V. When this occurs, the charging circuit is cut off or is changed over to that of trickle charging at a comparatively earlier stage which is before the predetermined time of the 1C charging period of time. As a result, it is inconvenient in that charged batteries are produced which are short of a predetermined electric charged amount and that there is also a dispersion of the length of the trickle charging time.

The present invention, as one of its objectives, is to improve a conventional battery of this kind and is to provide an alkaline storage battery that, even if the detector is a dispersed one, the dispersion in charging time is decreased and which can be given an electric charging without dispersion to the batteries.

According to this invention, in such a type of alkaline storage battery there is contained, in a battery container, a battery element comprising a positive electrode, a negative electrode, a separator and a gas ionizing auxiliary electrode, which is characterized in that the gas ionizing electrode is contained in a bag of microporous film.

Embodying examples of this invention will be explained with reference to the accompanying drawings.

Figure 3:
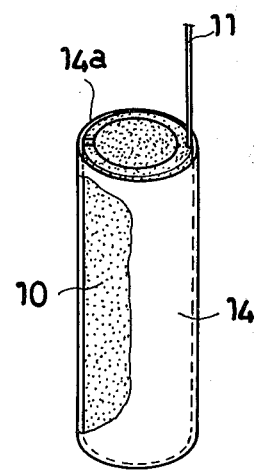
Figure 2:
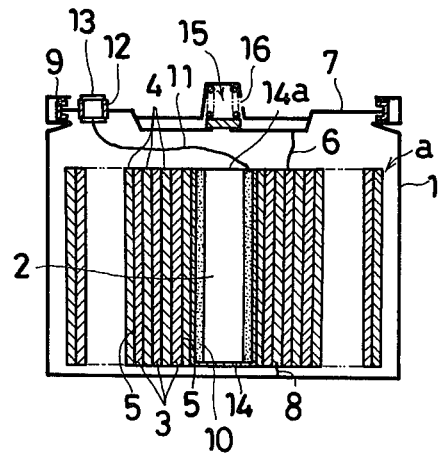
Figure 4:
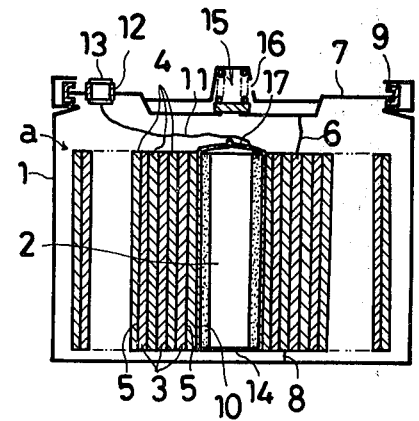

FIG. 1 is a comparison diagram of an electric voltage change showing curved lines of a conventional battery and the battery of this invention at the time of charging operation, FIG. 2 is a sectional side view of one example of this invention, FIG. 3 is a partial perspective view of an important section thereof, and FIG. 4 is a sectional side view of another embodying example of this invention.

Referring to FIG. 2 and FIG. 3 showing one embodying example thereof, numeral 1 denotes a battery container comprising a cylindrical metal battery casing, and a wound type battery element a which is fixedly contained in the battery casing 1. The battery element a is constructed in such a manner that a sintered type nickel positive electrode plate 3, a sintered type cadmium negative electrode plate 4 and a nylon non-woven separator 5 which is interposed between these electrodes are put one another in layers and are so wound as to have at its center a cylindrical hollow space 2. The volume ratio between the positive electrode plate 3 and the negative electrode plate 4 is so made as to be 1:1.5. The battery element a is impregnated with an aqueous KOH electrolyte of 1.26 in specific gravity. Numeral 6 denotes a leading wire for connecting the positive electrode plate 3 to a cup-form metal cover 7 applied to an upper annular step portion of the battery casing so as to close the opening thereof in airtight condition through an insulating packing ring by a common means of tightening. Numeral 8 denotes a leading wire for connecting the negative electrode plate 4 to the battery casing 1. Numeral 9 denotes an electric insulating sealing ring interposed between the circumferential edge of the metal cover 7 and a clamping edge portion of the upper circumference of the battery casing 1.

In order that the above constructed alkaline storage battery may be provided therein with a gas ionizing auxiliary electrode plate and thereby an electric voltage or an electric current at the time of electric charging may be detected, it has been hitherto usual that a hollow cylindrical gas ionizing auxiliary electrode plate 10 be contained as it is, for instance, in the central cylindrical hollow space 2 of the wound battery element a, and a leading wire 11 thereof be connected to a terminal 13 fixedly provided on the metal cover 7 through an electric insulation packing 12. According to this invention, however, the auxiliary electrode plate 10 is not contained in the battery by conventional means. Namely, the auxiliary electrode plate 10 of the present invention is contained in a bag 14 made of microporous synthetic resin such as microporous polypropylene or the like so the auxiliary electrode is separated by the bag 14 from the battery element a surrounding the same. The auxiliary electrode plate 10 is a conventional one, prepared so that a sintered body of carbonyl-nickel powder is mixed with a catalyst such as platinum or the like and is treated with a water repelling agent. The foregoing bag 14 is made, for instance, of microporous polypropylene film which is $0.2 \times 0.02\mu$ in largest pore size, 38% in porosity and $25\mu$ in thickness, and is preferably coated with a surface active agent to impart hydrophilic properties to the film. The microporous film may be properly changed in pore size, pore shape, porosity, thickness, synthetic resin material and others.

Numeral 15 denotes a safety valve means composed of a valve body, a spring and others and numeral 16 denotes a vent opening made in the cover 7.

When this invention, i.e., the sealed alkaline storage battery of the above construction, is intended to be charged to a predetermined level, by a rapid charging, for instance, while being measured in its charged condition, a detector (not shown) of an electric charging apparatus for measuring an electric voltage, for instance, of the auxiliary electrode plate in relation to any opposite electrode is brought into a bridge contact between the negative electrode terminal of the battery casing 1 and the auxiliary electrode terminal 13 between which a resistor of 100 Ω is interposed, and in this condition the 1C electric charging is carried out and the change in voltage between the negative electrode and the auxiliary electrode is measured, and as a result the change in voltage according to progress of the charging is obtained, having a curved line such as is shown in A in FIG. 1. In this case, the detector is previously so designed that it may be automatically cut off or changed over to a trickle charging function when the voltage reaches 0.6 V, for instance, in the same manner as in the conventional case. The voltage characteristic curved line A is such that it remains in almost a horizontal line, since there is little generated voltage until about 40 minutes elapses after the charging begins, and thereafter it abruptly increases and there takes place, in the vicinity of 0.6 V, a rise which is approximately a vertical line. As will be clear from the curved line A having such a vertical line part, even when the detector is operated erroneously below 0.6 V, such as at 0.55 V, there can be obtained such a charged condition which is almost the same as a charged condition obtained as if the same were operated at 0.6 V. Therefore, even where there is a dispersion in manufacturing of a detector, the amount of charge of the battery can be obtained at an equal level. That is, an inequality of the charged amounts of respective batteries can be decreased or eliminated as compared with the known, conventional type battery where the auxiliary electrode which is contained therein is in a naked condition. The prior art battery provides the curved line C having a gentle, inclined portion in the vicinity of 0.6 V. Accordingly, the trickle charging of the present battery can, if necessary, also be easily carried out for a constant time period, so that a predetermined equal amount of charging can always be given to each of the respective batteries. Further, as clear from the comparison between the curved lines C and A in FIG. 1, the present battery, provided with the auxiliary electrode contained in the bag, can be charged several minutes longer than the conventional battery which is provided with the naked auxiliary electrode, until the voltage reaches a predetermined level, for instance, 0.6 V. Consequently, an improved battery with increase in the charged amount can be obtained and good charging efficiency results.

FIG. 4 shows another embodying example. In this example, instead of an opening 14a of the bag 14 containing the auxiliary electrode 10, as shown in FIG. 4, the opening thereof is closed, as shown in 17, by means of heat sealing, an adhesive agent, etc. According to this example, a curved line of electric voltage change is one denoted by B in FIG. 1 which has a vertical curved line portion. Additionally, the charging times for reaching 0.6 V can be further prolonged, resulting in a further increase in the amount of charge.

Thus, according to this invention, the gas ionizing auxiliary electrode contained in an alkaline battery is so prepared as to be contained in a microporous bag, or sleeve, so that an operational curved line of the auxiliary electrode at the time of charging can be formed into one of an upright (vertical) curved line, and consequently a dispersion in charged amount of the battery can be decreased and, even when a dispersed detector is used, a predetermined uniform charging operation can be carried out.

I claim:

1. An alkaline storage battery comprising a container containing a battery element comprising a positive electrode, a negative electrode, a separator and a gas ionizing auxiliary electrode, wherein the gas ionizing electrode is a hollow tube electrode and is located in a center hollow space of a wound battery element and the gas ionizing electrode and the wound battery element are separated by the bag of microporous film interposed therebetween.

2. A battery according to claim 1, wherein the bag of microporous film containing the gas ionizing auxiliary electrode is open at its top end.

3. A battery according to claim 1, wherein the bag of microporous film containing the gas ionizing auxiliary electrode is sealed at its top end.

4. A battery according to claim 1, wherein the microporous film is a resin or plastic material.

5. A battery according to claim 4 wherein the microporous film is polypropylene.

6. A battery according to claim 1, wherein the bag of microporous film is $0.2 \times 0.02\mu$ in largest pore size, 38% in porosity and $25\mu$ in thickness.

* * * * *